United States Patent

[11] 3,633,474

[72] Inventor Irving Erlichman
Wayland, Mass.
[21] Appl. No. 33,601
[22] Filed May 1, 1970
[45] Patented Jan. 11, 1972
[73] Assignee Polaroid Corporation
Cambridge, Mass.

[54] CAMERA DOOR LATCH
10 Claims, 11 Drawing Figs.
[52] U.S. Cl..................................... 95/11 R,
95/13
[51] Int. Cl.......................................G03b 17/04
G03b 17/52
[50] Field of Search............................ 95/11, 13

[56] References Cited
UNITED STATES PATENTS
569,328 10/1896 Elliot.......................... 95/11
917,135 4/1909 Robertson................... 95/11
1,370,529 3/1921 Fouasse....................... 95/11
Re25,167 5/1962 Booth......................... 95/11 X Primary Examiner—John M. Horan
Assistant Examiner—Kenneth C. Hutchison
Attorneys—Brown and Mikulka and Alfred E. Corrigan ABSTRACT: A camera of the extensible type including a housing having a plurality of sections adapted for movement between a compact, inoperative position wherein components of the camera are located near the camera's film loading door and an extended, operative position wherein the components are moved away from the film loading door. The film loading door is coupled to one of the sections by a magnetic coupling and a release is provided for breaking the magnetic coupling to allow opening of the film loading door. A detent is mounted on the door and is adapted to move from a first position wherein it renders the release inoperative to break the magnetic coupling to a second position which renders the release operative as the sections of the camera move into the extended, operative position, thereby insuring that the components are moved away from the film loading door prior to its opening to reduce the possibility of damage to the components when an object is inserted into the film loading door opening.

INVENTOR.
IRVING ERLICHMAN

INVENTOR.
IRVING ERLICHMAN
BY Brown and Mikulka
and
Alfred E. Corrigan
ATTORNEYS 3,633,474

CAMERA DOOR LATCH

BACKGROUND OF THE INVENTION

1. Field of the Invention

This invention relates to photographic apparatus, e.g., cameras, of the type which includes a plurality of housing sections adapted for movement between a compact, inoperative position and an extended, operative position and, more particularly to such apparatus which includes means for preventing opening of the apparatus' film loading door when the apparatus is in the compact, inoperative position.

Many cameras of the extensible type are vulnerable to damage when a film container is loaded into the camera while the camera is in its compact, inoperative position. The reason or the foregoing is that usually some component of the camera's exposure system, e.g., the lens, shutter, or reflecting surface, is positioned adjacent the chamber which is adapted to receive the film container when the camera is in the compact, inoperative position. This proximity will often result in the component being struck and damaged by the film container upon loading of the latter into the chamber.

Another problem associated with cameras of the extensible type is accidental opening of the camera's film loading door when the camera is in the compact, inoperative position. Cameras of this type are highly compact when in the inoperative position and as such are quite often carried in the user's pocket or handbag where the film loading door is subject to being accidentally opened due to the door's actuating member, e.g., a latch, being actuated by an object located within the pocket or handbag or by being caught on the edge of the pocket or handbag, thereby possibly subjecting the film located within the camera to premature exposure to light entering the opening previously occupied by the loading door.

From the foregoing it can be seen that there is a need for a camera of the extensible type, e.g., a folding camera, whose film loading door cannot be opened while the camera is in the compact, inoperative position.

2. Description of the Prior Art

The prior art is replete with cameras of the extensible type which are adapted to be loaded with a film container while the camera is in -he compact, inoperative position, thereby subjecting components of the camera's exposure system to possible damage; and which can be accidentally opened while in the compact position, thereby exposing some if not all of the film contained therein. For example, see U.S. Pat. Nos. 3,132,572 and 3,357,330 granted to Downey and Murphy, respectively. However, the prior art fails to address itself directly to the aforementioned problems.

SUMMARY OF THE INVENTION

The invention relates to photographic apparatus of the extensible type, e.g., folding cameras, having a plurality of sections coupled for movement between a compact, inoperative position and an extended, operative position. One of the sections includes a support member for supporting a film unit in position for exposure and a closure member for providing ingress to the camera. When the camera is in the compact, inoperative position various components of the camera's exposure system are located near the support member where they are subject to being damaged during loading of the camera, and in the extended, operative position are moved to a relatively safe position away from the support member. The closure member is provided with an interlock which allows the closure member to be opened only when the camera is out of the compact, inoperative position thereby insuring that these components will be moved out of their close proximity to the support member prior to opening of the closure member.

Accordingly, an object of the invention is to provide, in photographic apparatus of the type including a plurality of sections adapted for movement between an extended, operative position and a compact, inoperative position and a film loading door for providing ingress to the interior of the camera to enable loading of film therein, means for preventing opening of the door when the camera is in the compact, inoperative position.

Another object of the invention is to provide, in photographic apparatus of the type mentioned having various components located near the camera's film loading door when the camera is in a compact, inoperative position and which are moved away from the film loading door when the camera is in the extended, operative position, means to prevent opening of the door when the camera is in the compact, inoperative position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
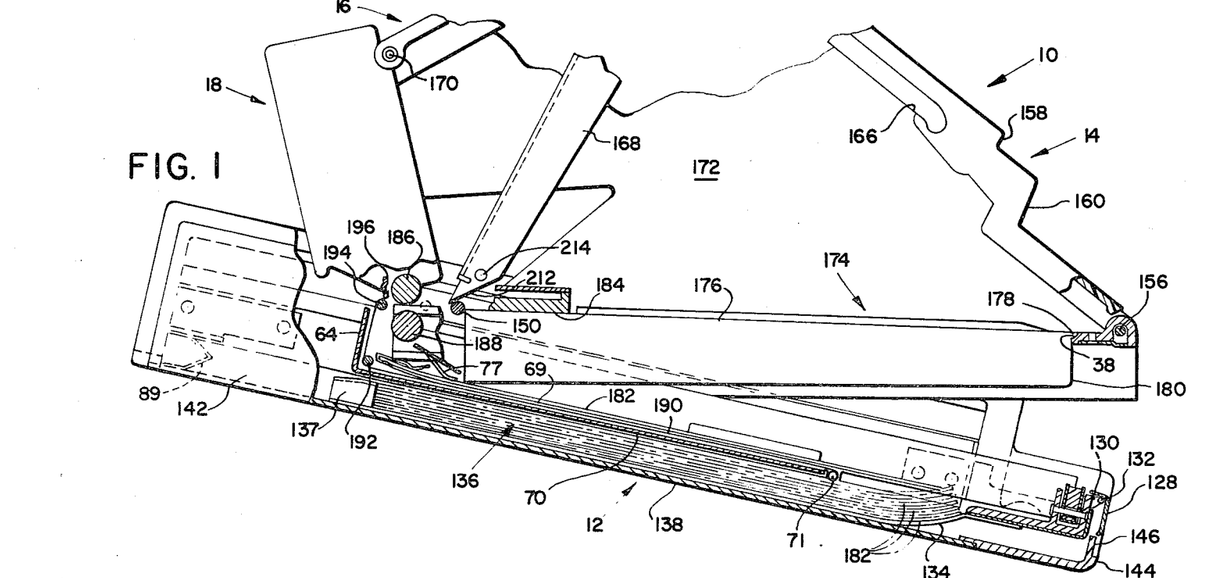
FIG. 1 is an elevation view, partly in section, of an extensible-type camera shown in its extended, operative position with its film loading door in the open or loading position.
Figure 3:
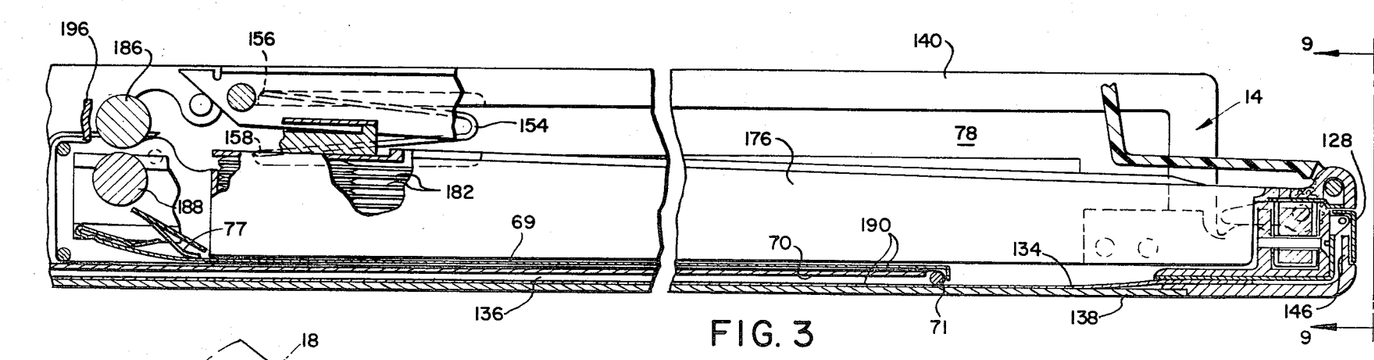
FIG. 3 is an elevation view, partly in section, of a portion of the camera shown in the compact, inoperative position.

REference is now made to FIG. 1 of the drawings wherein is illustrated a camera 10 of the extensible type. Camera 10 includes a plurality of sections 12, 14, 16 and 18 pivotally coupled to each other for movement between the extended, operative position (except for the film loading door being open) shown in FIGS. 1 and 6, and the compact, inoperative position shown in FIGS. 3 and 5.

Figure 2:
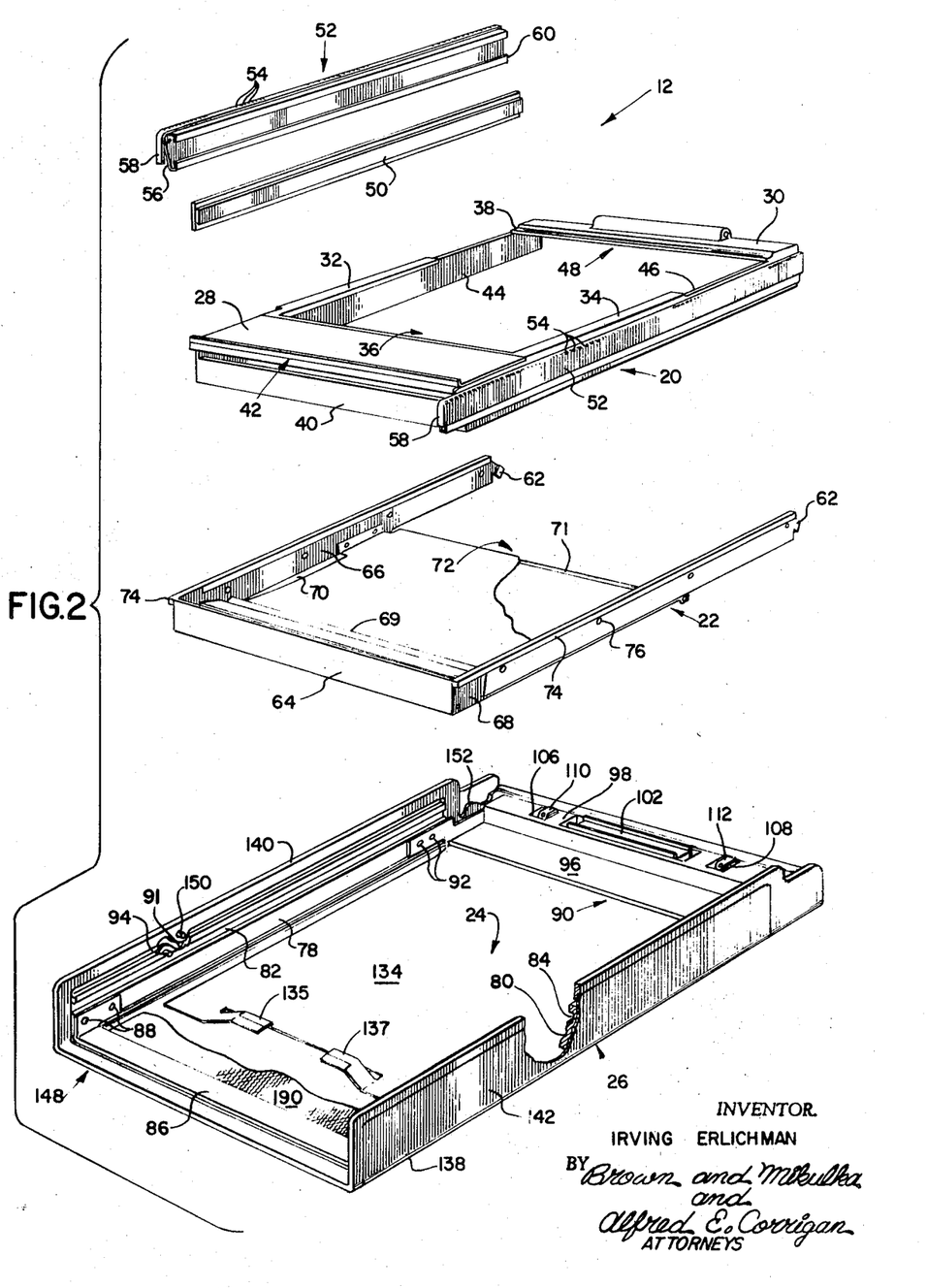
FIG. 2 is an exploded perspective view, partly in section, of one of the sections of the camera shown in FIG. 1.

Referring to FIG. 2 it can be seen that section 12 is comprised of a plurality of members including an inner frame member 20 for supporting a container of film units in position for exposure, the contacting surfaces of the film container and inner frame member forming a lighttight seal; a drawer 22 adapted to receive a film unit subsequent to exposure thereof and to transfer the film unit to a storage chamber within the camera; and an outer frame member 24 which cooperates with drawer 22 to guide it in a reciprocating manner and further cooperates with a bottom cover member or closure member 26 to define a film storage chamber as will be more fully explained hereinafter. Because of space limitations in the drawing of FIG. 2, outer frame member 24 and closure member 26 are not shown in an exploded relation but rather in the positions they occupy relative to each other when the camera is in the compact, inoperative position.

Inner support member 20 includes a forward wall comprised of sections 28, 30, 32 and 34 which cooperate to define an exposure opening 36. Wall portion 28 encloses means (not shown) for entering a film container and moving a film unit therefrom subsequent to exposure of the latter in a manner similar to that disclosed in my copending application, Ser. No. 179, filed Jan. 1, 1970, entitled Photographic Apparatus, and assigned to the same assignee as the instant application. Wall portion 30 includes a recess 38 for receiving a lip on the film container for supporting the latter, while wall portions 32 and 34 restrict the upward movement of the film container relative to the inner frame member and assist in locating the forwardmost film unit in position for exposure. The inner frame member 20 further includes a leading end wall 40 having an elongated opening 42 therein dimensioned to allow passage of a film unit therethrough and sidewalls 44 and 46. The trailing end of inner frame member 20 is provided with an opening 48 which facilitates the insertion of a film container into position within inner frame member 20. Fixedly mounted on each sidewall 44 and 46 is an elongated rack support member 50 having a T-shaped configuration in cross section for receiving and slidably supporting a generally U-shaped rack 52. Each rack 52 includes a plurality of apertures 54 therein for receiving the teeth of a sprocket for moving the racks in a reciprocating manner. One end 56 of the rack is provided with a downwardly turned member 58 which is adapted to engage the rearwardly facing surface (to the right as viewed in FIG. 2) of the leading end wall 64 of the drawer 22 for moving the drawer 22 outwardly, i.e., to the left as seen in FIG. 1, and an end 60 which is adapted to engage means 62 on the drawer 22 for moving the latter to the right as seen in FIG. 1.

Drawer 22 includes a leading end wall 64, sidewalls 66 and 68 and a rear wall 70. Rear wall 70 is terminated at its trailing end by a rotatably mounted roller 71 mounted intermediate the ends of walls 66 and 68 in order to facilitate movement of a curtain thereover as will be explained shortly and a resilient spring clip 69 which is adapted to grip the leading end of a film unit. An elongated bearing member 74 is mounted on each sidewall 66 and 68 by suitable means such as rivets 76.

Figures 9, 10, 11:
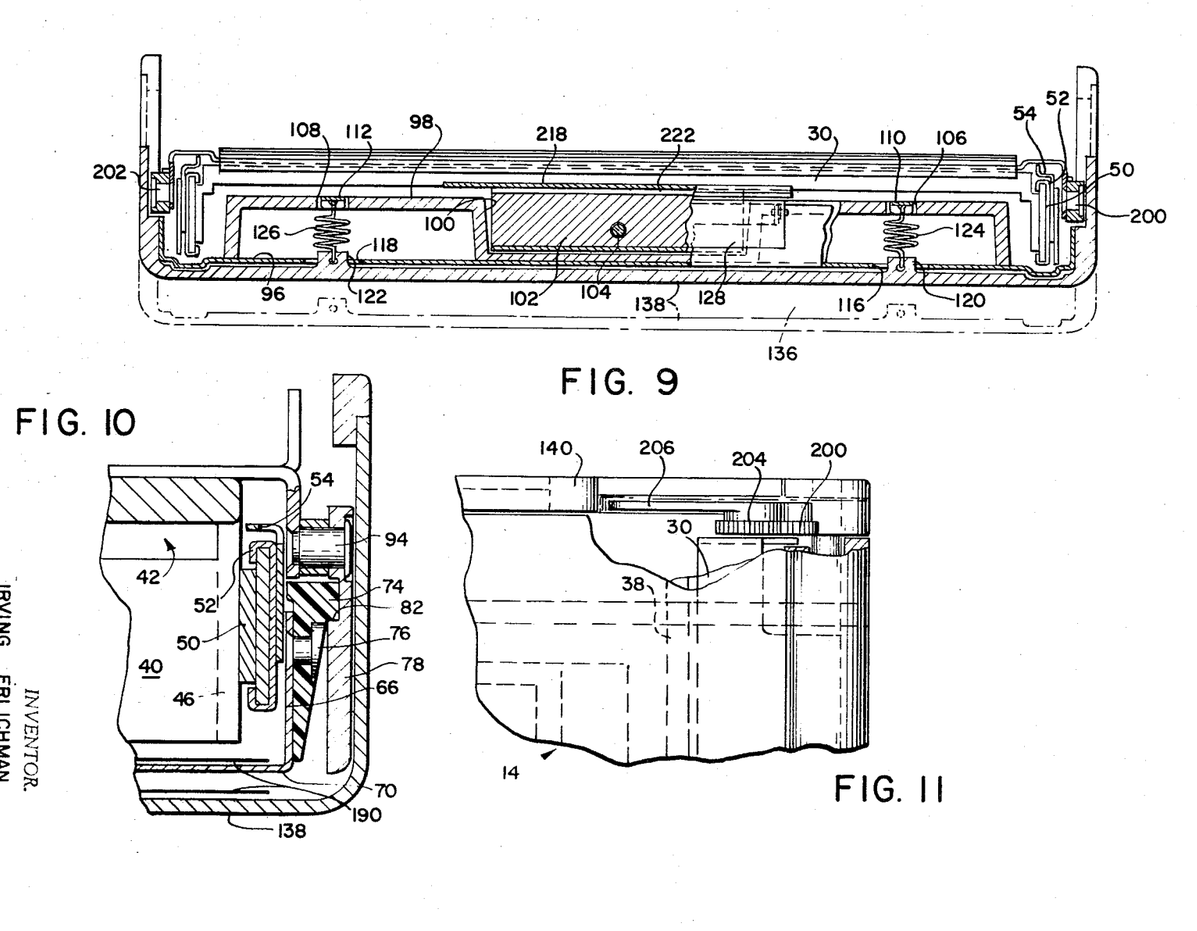
FIG. 9 is a view, partly in section looking in the direction of arrows 9—9 in FIG. 3.
FIG. 10 is an elevation view, partly in section, of a pivotal connection between the camera's film loading door and a film support member.
FIG. 11 is a fragmentary elevation view, partly in section, of one corner of the camera.

Outer frame member 24 includes a pair of sidewalls 78 and 80 having recessed guides 82 and 84 therein for slidably receiving the bearing members 74. The leading ends of sidewalls 78 and 80 are attached to a member 86 by rivets 88. The trailing ends of sidewalls 78 and 80 are connected to a support member 90 by rivets 92. Each of the sidewalls 78 and 80 further includes a recess 91 for receiving a cam follower as will be explained hereinafter and a pivot pin 94 about which closure member 26, outer frame member 24 and drawer 22 pivot as a unit to the open position shown in FIG. 1. Support member 90 includes a first portion 96 adapted to receive one end of inner frame member 20 and a second raised portion 98 which is adapted to support a closure means in the form of a magnet 102. SEcond portion 98 includes an elongated recessed section 100 in which is mounted magnet 102 by suitable means such as a screw 104 (see FIG. 5). Second portion 98 further includes apertures 106 and 108 which are adapted to receive lugs 110 and 112 extending from the trailing end wall 114 of outer frame member 24. A second pair of apertures 116 and 118 (see FIG. 9) are located in support member 90 in alignment with apertures 106 and 108. In the compact, inoperative position of the camera, a second pair of lugs 120 and 122, integral with closure member 26, extend through apertures 116 and 118, respectively. Lugs 110, 112, 120 and 122 are adapted to mount a pair of tension springs 124 and 126 for resiliently urging closure member 26 toward outer frame member 24. A lever 128 is pivotally mounted to second portion 98 by flanges 130 and pins 132 (only one of each being shown). Lever 128 is adapted to be actuated in a clockwise manner by the user of the camera to break the magnet coupling between the magnet 102 and the inner frame member 20 as will be more clearly explained hereinafter. A resilient plate 134 is connected at its trailing end to the underside of first portion 96 and includes a pair of upwardly projecting resilient stop members 135 and 137. As can be seen in FIGS. 1 and 2, the bias of plate 134 is such that the greater portion of the plate remains in contact with closure member 26 in all positions of the camera. Plate 134, in cooperation with closure member 26, outer frame member 24 and drawer 22, defines a storage chamber 136 having a variable volume for storing film units subsequent to exposure and is the subject matter of an invention disclosed and claimed in application Ser. No. 36,251, filed by Edwin H. Land and Irving Erlichman on May 11, 1970, said application being assigned to the assignee of the instant application.

Figure 4:
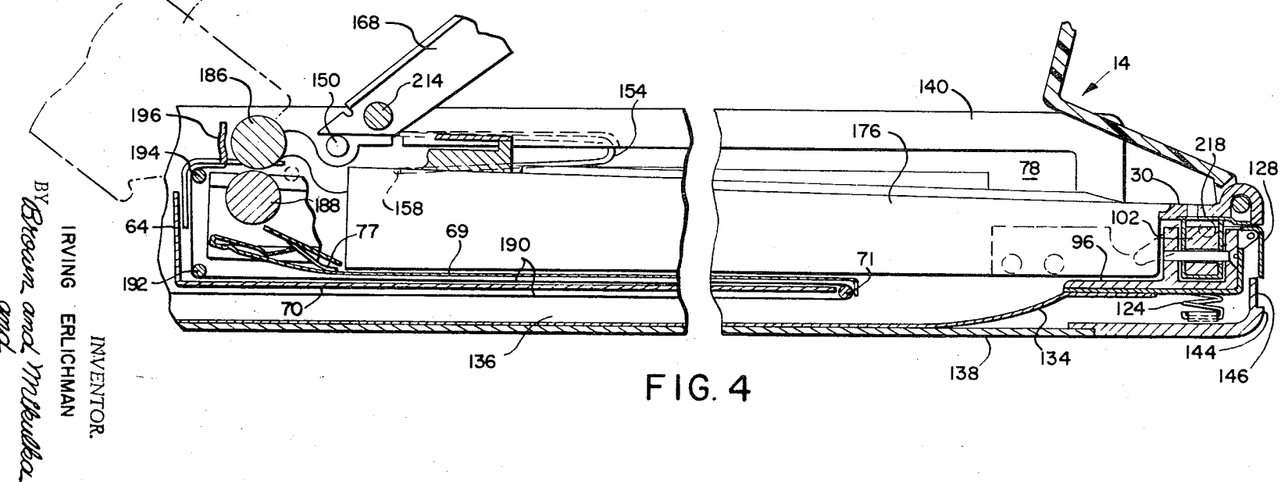
FIG. 4 is a view similar to FIG. 3 showing sections of the camera in a position intermediate the compact, inoperative position and the extended, operative position.

Closure member 26 includes a generally rectangularly shaped rear wall 138, a pair of upstanding sidewalls 140 and 142, a trailing end wall 144 having a section 146 of reduced thickness and an open leading end 148. As can be seen in FIG. 2, outer frame member 24 is adapted to be positioned within closure member 26. Cam followers 150 (only one of which is shown), having a common axis, are mounted on each sidewall 140 and 142 and are adapted to be moved into recesses 91 in sidewalls 78 and 80. A second set of cam followers 152 (only one of which is shown) extends from sidewalls 140 and 142. Spring means 154 (see FIGS. 3 and 4) has one of its ends 156 suitably attached to sidewall 140 of closure member 26 and its other end 158 connected to inner frame member 20 for resiliently urging closure member 26 toward outer frame member 24.

Figure 5:
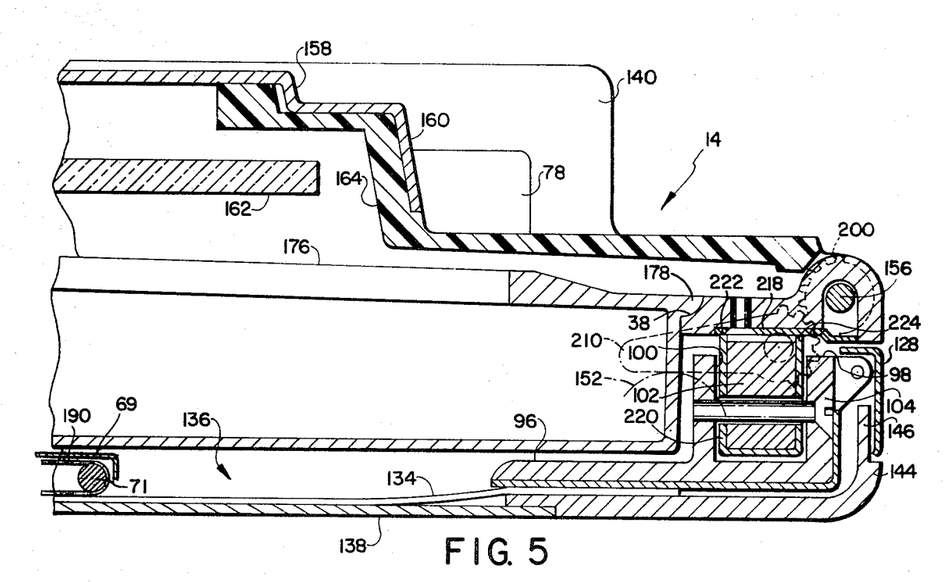
FIG. 5 is an enlarged elevation view, partly in section, of one end of the camera, the camera being shown in the compact, inoperative position.
Figure 6:
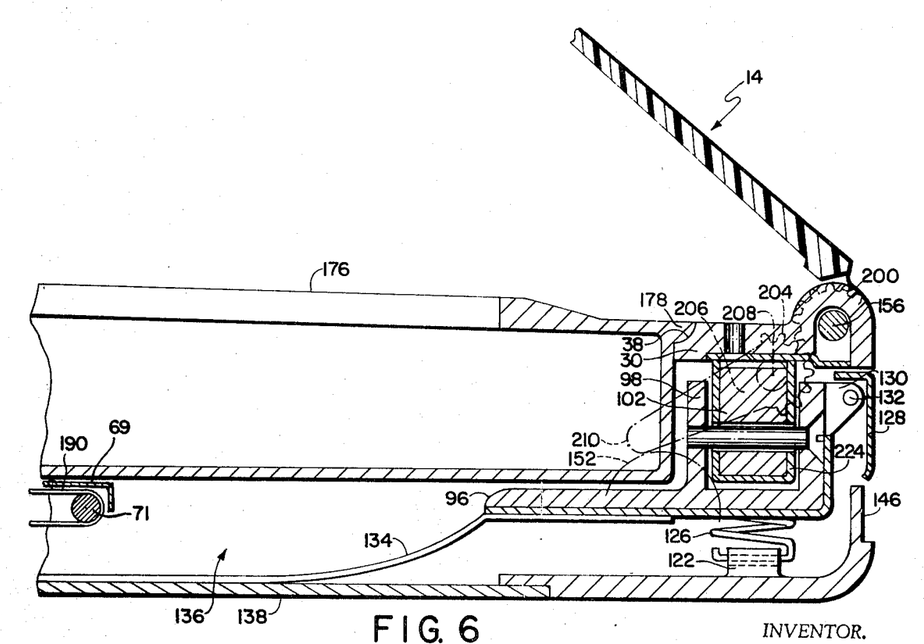
FIG. 6 is a view similar to FIG. 5 showing sections of the camera in the extended, operative position.
Figure 7:
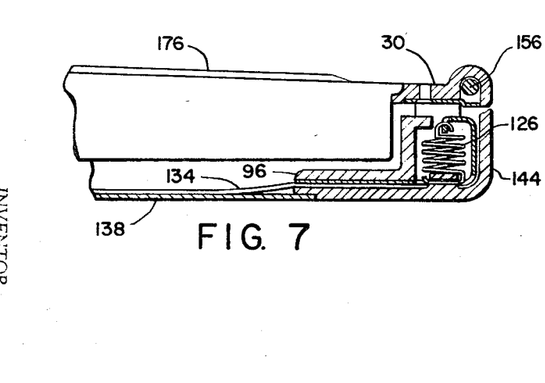
FIGS. 7 and 8 are elevation views, partly in section, of one end of the camera showing a resilient connection between one of the sections of the camera and its film loading door.
Figure 8:
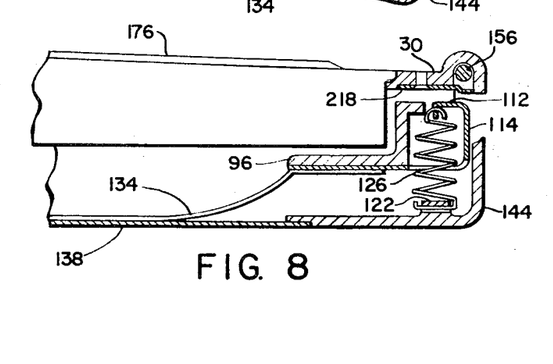

Section 14 is pivotally coupled to inner frame member 20 about pivot pin 156 for movement between the compact, inoperative position shown in FIG. 5 and the extended, operative position shown in FIG. 6. Section 14 further includes a pair of recesses 158 and 160 for receiving a rangefinder-viewfinder (not shown) when in the compact position. A component of the camera's exposure system, i.e., a reflecting surface or mirror 162, is mounted on the interior surface 164 of section 14 by any suitable means. Each side of section 14 has a slot 166 therein which is adapted to receive a pin mounted on an erecting link 168 for guiding the sections 12, 14, 16 and 18 between the compact and extended positions.

Section 18 is pivotally coupled to the inner frame member 20 at one end and has its other end pivotally coupled to section 16 about hinge 170. Section 16 is in turn pivotally coupled to secton 14 to complete the interconnection between the sections 12, 14, 16 and 18. Section 18 houses the camera's lens and shutter assembly as well as various other parts of the camera including a motor for operating various components of the camera. A flexible bellows 172 is attached to sections 12, 14 and 18 to provide a lighttight path between the camera's lens and shutter assembly and the photosensitive element located in position for exposure within film container 38. For a more detailed description of sections 14, 16 and 18 reference is made to the copending application of Lawrence M. Douglas entitled Camera Latch, Ser. No. 885,420, filed Dec. 16, 1969, and assigned to the same assignee as the instant application.

Positioned within and supported by inner frame member 20 is a film assemblage 174 of the type shown in my copending application entitled Film Container, Ser. No. 13,623 filed Feb. 24, 1970 and assigned to the same assignee as the instant application. Film assemblage 174 includes a container 176 having a lip 178 located near its trailing end 180 which is adapted to be received by recess 38 in inner support member 20 for supporting the trailing end of the film container in position for exposure of the forwardmost film unit located within the container. Any suitable means may be provided for supporting the remainder of the film container in the position shown in solid lines in FIG. 1, e.g., rails and grooves as taught in my copending application Ser. No. 13,623.

Positioned within the container 176 are a plurality of film units 182 of the type shown and described in U.S. Pat. No. 3,415,644, granted to Edwin H. Land on Dec. 10, 1968 and assigned to the assignee of the instant application. Film units 182 are adapted to be moved, subsequent to exposure, from a first position, i.e., their exposure position which lies generally in a plane containing an interior surface 184 of inner support member 20, into the bite of a pair of pressure-applying members, e.g., rolls 186 and 188, which are adapted to spread a processing agent between elements of the film unit as described in said patent. After the film unit has passed from between the rolls 186 and 188 it is moved to a second position within the camera wherein it is available for viewing by the user prior to being moved into storage chamber 136.

A curtain 190, made from any suitable opaque material is mounted between rolls 186 and 188 and outer frame member 24 in order to provide a lighttight environment for the exposed film unit as it is moved between the exposure position and the viewing position. Curtain 190, which is of a fixed length, has one of its terminal ends secured to the underside of member 86 (see FIG. 2). The curtain extends rearwardly (to the right as viewed in FIG. 1) over stop members 135 and 137 to a point whereat it reverses its direction around roll 71. From roll 71 the curtain extends to the left until it reaches a roll 192 rotatably mounted within drawer 22. The curtain then extends around roll 192 upwardly and over a second roll 194, rotatably mounted on drawer 22 and finally has its other terminal end secured to part of the fixed camera structure at 196.

As the sections of the camera move between the compact, inoperative position shown in FIG. 5 to the extended, operative position shown in FIG. 6 a storage chamber 136 of variable volume is generated. The structure for accomplishing this includes a pair of sector gears 200 (only one of which is shown) mounted on opposite sides of pin 156 for rotation about their axis as section 14 moves between the compact and extended positions. Each sector gear 200 is in mesh with a second sector gear 204 mounted on the end of a link 206 pivotally mounted at 208 on a fixed portion of the camera's structure. The other end of each link 206 has a cam surface 210 which is adapted to engage a cam follower 152 located on each side of closure member 26. As can be seen in FIGS. 5 and 6, when section 14 moves to the extended position links 206 rotate in a counterclockwise manner to move cam followers 152 and closure member 26 away from outer frame member 24 thereby increasing the volume of storage chamber 136 until it reaches its maximum volume when the camera is in its extended, operative position as shown in FIG. 6. A second set of cam surfaces 212 (only one of which is shown) located on the lower end of each erecting link 168 are provided for engaging cam followers 150 attached to sidewalls 140 and 142 of closure member 26 for moving closure member 26 away from outer frame member 24 as erecting links 168 pivot about hinge 214 in a counterclockwise manner.

As the sections of the camera move from the extended position to the compact position, cams 210 and 212 will try to move out of engagement with their respective cam followers. However, springs 124, 126 and 154 will urge the cam followers into contact with their respective cams until such time that the thickness of one or more film units located within storage chamber 136 prevents closure member 26 from moving any closer to outer frame member 24. This cooperation between the cams, cam followers and springs enables the volume of the camera in the compact position to be kept to a minimum, the minimum volume being directly related to the number of film units located within storage chamber 136. In other words, as the camera is moved into the compact position, the volume of storage chamber 136 will automatically be reduced to one which is just sufficient to hold the precise number of film units located within the chamber, thereby keeping the volume of the entire camera to a minimum when the camera is in the compact position.

Cameras of the type so far described, are susceptible to damage during the film loading process because of the close proximity of one or more of the camera's exposure components to the chamber which receives the film container 176. The reason for this is that cameras of the extensible type are usually capable of being loaded while the camera is in the compact, inoperative position. As can be seen in FIG. 5, one of the components of the camera's exposure system, i.e., reflecting surface or mirror 162, is located closely adjacent the area which is adapted to receive the film container 176. If a film container were to be loaded into position within inner support member 20 while the camera is in the compact position shown in FIG. 5, there is a good possibility that the film container will strike mirror 162 and either damage it or cause misalignment of the mirror. Further, because of the compactness of cameras of this type, they are quite often carried in the user's pocket or handbag wherein the camera's loading door latch is subject to accidental actuation, thereby allowing the film loading door to partially open and possibly dislodge the film container and prematurely expose the film units contained therein. Provision is made in the instant camera to ensure that components of the camera's exposure system, which ordinarily lie in a position near the camera's structure which is adapted to support the film container when the camera is in the compact position, are moved to a position away from said structure as the camera is moved into the extended position before the film loading door can be opened. As can be seen in FIGS. 5 and 6, closure member 26 is coupled to inner support member 20 by the magnetic attraction between magnet 102 and a plate 218 mounted on the underside of inner support member 20. Magnet 102 is partially encompassed by a metallic plate 220 for forming a horseshoe-type magnet having its poles at 222 and 224. Poles 222 and 224 space the magnet 102 away from plate 218 so as to create a magnetic field therebetween. A lever 128 is provided for breaking the magnetic coupling between magnet 102 and plate 218 to allow movement of closure member 26, outer frame member 24, and drawer 22 to move as a unit to the film loading position shown in FIG. 1. However, as will be noted in FIG. 5, a portion 146 of rear wall 144 is located in a position adjacent lever 128, such that actuation of lever 128 when the camera is in the compact position is prevented by the interference of detent or portion 146. As the camera moves from the compact position of FIG. 5 to the extended position of FIG. 6, closing member 26 is moved away from outer frame member 24 as previously described. As closure member 26 moves away from outer frame member 24, detent 146 is withdrawn from its position in interference with lever 128 to a position which enables actuation of lever 128 to break the magnetic coupling and move closure member 26, frame member 24, and drawer 22 to the position shown in FIG. 1. In this position, i.e., the extended position, the mirror 162 has been moved away from inner support member 20 thereby reducing the possibility of accidentally striking the mirror 162 upon inserting an object through the opening normally occupied by the closure member.

OPERATION

When it is desired to load a film assemblage 174 into the camera of the present invention, the camera as shown in FIG. 5 is erected or extended so that it assumes the configuration shown in FIG. 6. As the camera moves between the compact position of FIG. 5 and the extended position of FIG. 6 cam surfaces 210 and 212 move cam followers 152 and 150 downwardly to space closure member 26 from outer frame member 24 to provide a storage chamber 136. As closure member 26 moves away from outer frame member 24 detent 146 mounted on trailing end wall 144 of closure member 26 moves out of its position in interference with lever 128 to a position wherein lever 128 is capable of actuation. Actuation of lever 128 breaks the magnetic coupling between magnet 102 and plate 218 to allow closure member 26, outer frame member 24, and drawer 22 to pivot about the axis of pivot pin 94 to the open or loading position shown in FIG. 1. Any film units which may be located in storage chamber 136 or in drawer 22 are removed at this time along with the empty film container 176. After inserting a new film assemblage 174 into position within inner support member 20, closure door 26, outer frame member 24, and drawer 22 are moved as a unit to their closed position shown in FIG. 5. The next step is to actuate the camera's shutter mechanism which closes a circuit between a supply of energy, e.g., a battery located within the camera or container, and the camera's motor for operating rolls 186 and 188 and the film advancing apparatus of the camera to move a dark slide located between the forwardmost film unit 182 and the top or forward wall 184 of the film container 176 into the bite of rollers 186 and 188. Simultaneous with the operation of the film advancing apparatus, sprocket gears having their teeth in mesh with one of the apertures 54 in racks 52 are rotated in such a direction as to advance drawer 22 to the left as viewed in FIG. 1. The ratio between the gearing for driving the rolls 186 and 188 and the drawer 22 is such that the rolls 186 and 188 will advance the dark slide to the left at a faster rate than the drawer is moving to the left. Before drawer 22 reaches its furthermost travel to the left the leading end of the dark slide has advanced to a position wherein it is grasped by a resilient spring clip 69 mounted on rear wall 70 of drawer 22. Further leftward movement of the drawer removes the trailing end of the dark slide from between rolls 186 and 188. The construction of spring clip 69 is such as to move the trailing end of the dark slide downwardly to a level below roll 188. At this time means (not shown) are provided for reversing the drive of the sprocket which is engaged with racks 52 to reverse the direction of drawer 22, i.e., move the drawer 22 to the right as viewed in FIG. 1. As drawer 22 moves to the right the dark slide is moved beneath roll 188 where it lies on top of spring clip 69 and the circuit to the camera's motor is opened to complete the operating cycle.

The camera is now ready for exposure of the forwardmost film unit 182 located within film container 176. Actuation of the shutter's release will simultaneously actuate the shutter to expose the forwardmost film unit and energize the drives to the film advancing means, rolls 186 and 188, and the pinion drive for drawer 22. Again, drawer 22 reciprocates in the same manner as previously described. Note, at the time drawer 22 starts its movement to the left the dark slide is still located on spring clip 69 within drawer 22. Suitable means, e.g., spring 77, is provided for removing the dark slide from the bite of spring clip 69 as the drawer 22 moves to the left thereby preventing the dark slide from moving with the drawer to the left. The exposed film unit passes between the rolls 186 and 188 which distribute a processing liquid between elements of the film unit for initiating development thereof. Just prior to the drawer reaching its limit of travel to the left, the leading edge of the film unit catches up with and enters the bite of spring clip 69. Spring clip 69 grips the film unit's leading edge until the film unit's trailing edge has passed from between the rolls 186 and 188. During this time the bottom wall 70 of drawer 22 and spring clip 69 have passed from beneath the dark slide thereby enabling the dark slide to fall into the storage chamber 136. When drawer 22 reaches the extent of its leftward travel the sprocket drive to racks 52 is again reversed to move the drawer 22 to the right. As with the dark slide, the exposed film unit moves beneath rolls 188 as the drawer 22 returns to its original position, i.e., with the leading end wall 64 of drawer 22 located closely adjacent the rolls 186 and 188. At this time should the user of the camera desire to view the processed film unit he may now actuate lever 128 to move closure member 26, outer frame member 24, and drawer 22 to the position shown in FIG. 1. Since the film unit at this time is now located within drawer 22 the user may simply view the film unit in place or remove the film unit, examine it and return it to its position within drawer 22. After viewing the exposed film unit closure member 26 is then moved together with outer frame member 24 and drawer 22 to the closed position and the next succeeding film unit 182 within film container 176 may be exposed. As the succeeding film units are sequentially exposed and moved from their exposure position to the left into the drawer 22 and then to a second viewing position wherein the film unit is located within the drawer 22, the preceding film unit has dropped into the storage chamber 136. Stop members 135 and 137 located near one end of the storage chamber prevent the film units located within the storage chamber 136 from being moved to the left due to the frictional engagement between the uppermost film unit located within the storage chamber and the curtain 190 as the drawer 22 moves to the left. Further, a flexible, opaque sheet 89 is mounted between closure member 25 and member 86 to prevent the admission of light into the storage chamber 136. If at any time between exposures the user of the camera desires to view one of the film units located within the storage chamber 136 he merely has to actuate lever 128 to move closure member 26, outer frame member 24 and drawer 22 to the position shown in FIG. 1. The user may then remove the film unit from exposure chamber, view it and return it to the storage chamber. If, after taking a number of exposures less than the number of film units originally contained within film container 176, the user decides to move the sections of the camera into the compact, inoperative position storage chamber 136 will reduce its volume to one which is just sufficient to contain the number of film units located therein as previously explained, thereby keeping the overall volume of the camera to a minimum.

From the foregoing it can be seen that there has been disclosed a novel and unobvious cooperation of structure for ensuring that the film loading door or closure member of a camera cannot be opened while the camera is in the compact position and components of the camera's exposure system are located closely adjacent the area within the camera which is adapted to be occupied by the film container upon loading of the latter. This cooperation reduces the possible damage to these components upon inserting an object into the opening previously occupied by the film loading door and ensures that the camera, while being carried in the user's pocket or handbag in a compact position, cannot inadvertently be opened thereby subjecting the film units located within the camera to possible premature exposure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. PHotographic apparatus comprising, in combination:
   a housing having a plurality of sec tons including a first section having support means for supporting a photosensitive element in position for exposure and at least a second section movably coupled to said first section for movement between an extended, operative position and a compact, inoperative position;
   closure means forming at least a portion of said first section, said closure means being movable between open and closed positions to permit loading of a photosensitive element into position with said support means;
   first means for coupling said closure means to a portion of said first section;
   second means for uncoupling said first means from said portion of said first section, said second means being engageable by the user in both the extended, operative position and the compact, inoperative position; and
   third means for rendering said second means operative only when said sections are out of said compact, inoperative position.

2. Photographic apparatus as defined in claim 1 further including fourth means for automatically moving said third means to a position which renders said second means operative when said first and second sections are moved into said extended, operative position.

3. Photographic apparatus as defined in claim 2 wherein said third means is mounted on said closure means for movement therewith.

4. Photographic apparatus as defined in claim 3 further including resilient means for coupling said closure means to said first section.

5. Photographic apparatus as defined in claim 4 where in said fourth means spaces said closure means from said first means as said first and second sections move toward the extended, operative position.

6. Photographic apparatus as defined in claim 5 wherein said first means includes a magnet.

7. Photographic apparatus as defined in claim 6 wherein said second means is coupled to said first section and is adapted to break the magnetic coupling between said magnet and said portion of said first section to allow opening of said closure means when said first and second sections are in the extended, operative position.

8. Photographic apparatus as defined in claim 7 wherein said resilient means returns said third means to a position which renders said second means inoperative to break said magnetic coupling when said first and second sections are moved into the compact, inoperative position.

9. Photographic apparatus as defined in claim 1 further including a component coupled to said second section for movement therewith, whereby loading of a photosensitive element into position with said support means is possible only when said component has been moved away from said support means.

10. Photographic apparatus as defined in claim 9 wherein said component is a reflecting means.

* * * * *